US005567050A

United States Patent [19]

Zlobinsky et al.

[11] Patent Number: 5,567,050

[45] Date of Patent: Oct. 22, 1996

[54] APPARATUS AND METHOD FOR RAPIDLY OSCILLATING SPECIMEN VESSELS

[75] Inventors: Yury Zlobinsky, Massapequa; Michael Glater, Brooklyn; Frank Grave, Albertson, all of N.Y.

[73] Assignee: Savant Instruments, Inc., Farmingdale, N.Y.

[21] Appl. No.: 294,544

[22] Filed: Aug. 23, 1994

[51] Int. Cl.[6] .......... B01F 11/00

[52] U.S. Cl. .......... 366/209; 366/110; 366/219

[58] Field of Search .......... 366/108, 110, 366/111, 112, 197, 198, 202, 203, 208, 209, 210, 211, 216, 218, 219, 235, 237, 217

[56] References Cited

U.S. PATENT DOCUMENTS

| | | | |
|---|---|---|---|
| 2,151,123 | 3/1939 | Lavine | 366/211 |
| 3,261,594 | 7/1966 | Michel | 366/202 |
| 3,749,371 | 7/1973 | Folkenroth | 366/209 |
| 4,202,634 | 5/1980 | Kraft | 366/208 |
| 4,702,610 | 10/1987 | Reynolds, Jr. | 366/213 |
| 5,171,539 | 12/1992 | Coombs | 366/208 |
| 5,184,893 | 2/1993 | Steele | 366/208 |

OTHER PUBLICATIONS

Article excerpt "Laboratory Cell Disrupters, Part 1"–Tim Hopkins–one page (No Date).

Advertisement from American Biotechnology Laboratory, Feb. 1994–one page.

Instructions for the Mini–Beadbeater Cell Disrupter etc–3 pages (No Date).

Specification and product sheets of Biospec Products–3 pages (No Date).

*Primary Examiner*—Robert W. Jenkins
*Attorney, Agent, or Firm*—Morrison Law Firm

[57] ABSTRACT

Apparatus and method for rapidly oscillating specimen containing vessels such as those used in an RNA recovery operation wherein small sized glass sized beads in the vessel are employed to disrupt the cell walls of an RNA component to release the RNA, includes a specimen vessel holder provided as a disc in which the containers are received. The disc is operably connected with oscillatory motion producing means that in operation oscillates the disc rapidly in an oscillatory movement up and down symmetrically of a fixed vertical axis. The disc is haltered so it cannot rotate about the fixed axis. Locking means in the form of a locking plate locks the vessels on the vessel holder and applies a clamping force thereto to prevent relative movement between the vessels and the holder to prevent generation of heat that could be of deleterious effect to the specimen material or the vessels holding same.

23 Claims, 6 Drawing Sheets

FIG. 5
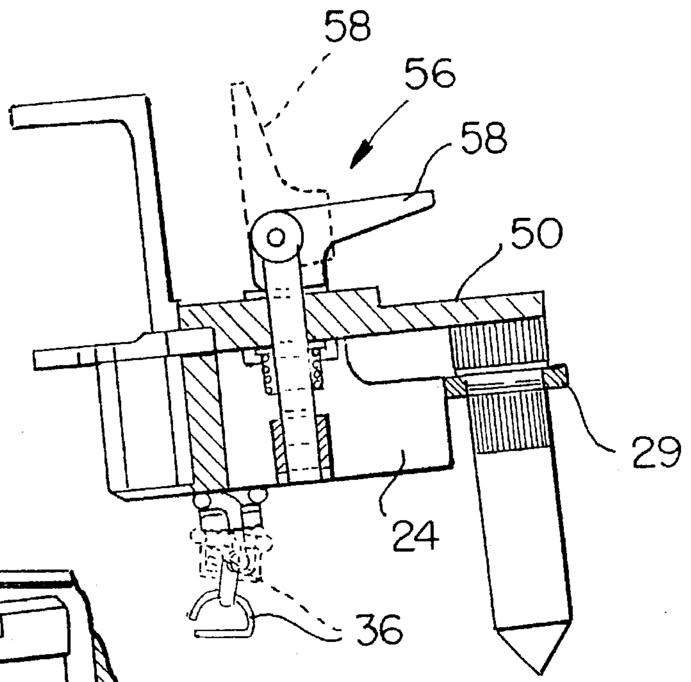
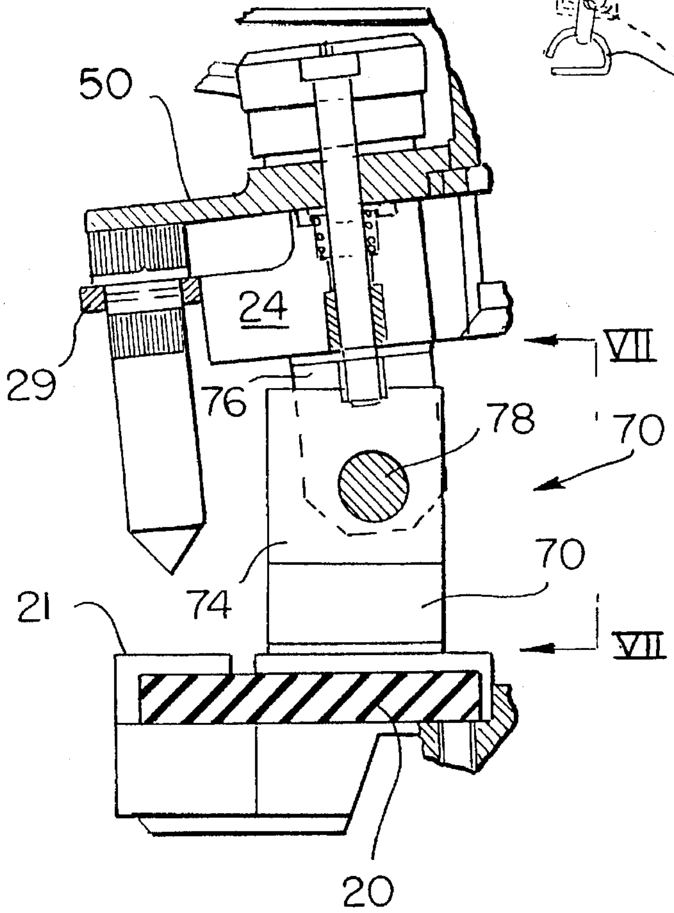
FIG. 6
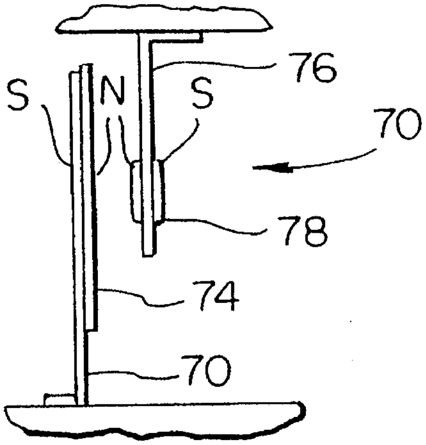
FIG. 7

FIG. 8
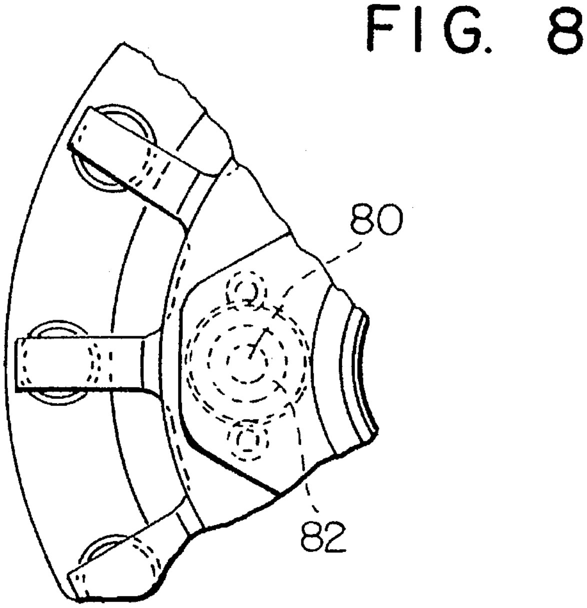
FIG. 9
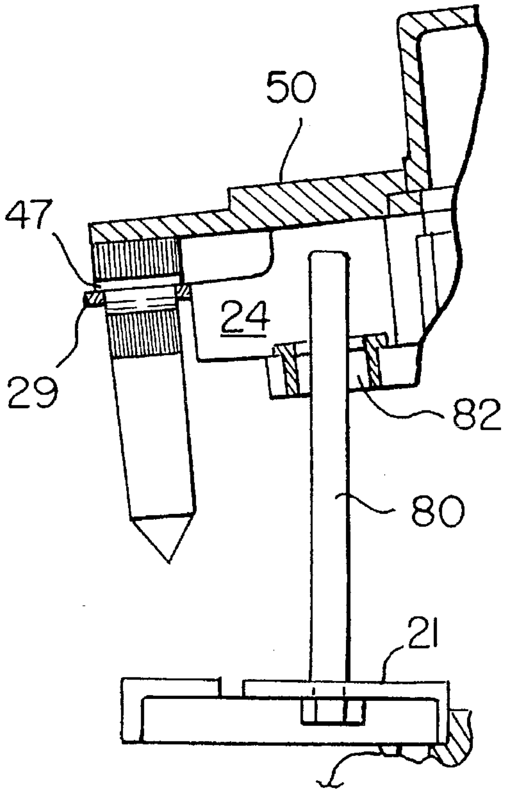
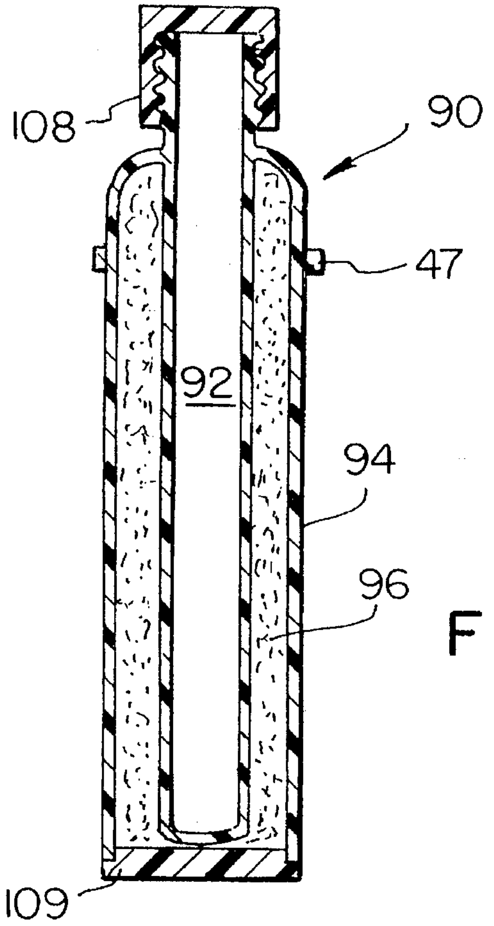
FIG. 10

APPARATUS AND METHOD FOR RAPIDLY OSCILLATING SPECIMEN VESSELS

BACKGROUND OF THE INVENTION

The present invention relates to apparatus and method for rapidly oscillating specimen containers or vessels and, more particularly, to apparatus especially suited for use in recovery of RNA from source material such as a bacteria, a biological tissue, a plant tissue etc and wherein separation of RNA from the cell walls of the source material is effected by the high velocity of impact to which the specimen material is subjected during the oscillating movement of the vessels causing fracturing of the cell walls of the material to release the RNA.

Recovery of RNA is desirable from the perspective of utilization of the recovered RNA for diagnostic, therapeutic and analogous purposes. Chemical separation of the RNA from a source is a commonly used separation practice but has the disadvantage of lengthy processing time.

It also is known to mechanically lyse source material to release genetic material such as RNA or DNA. Generally this involves subjecting the source material to mechanical force and energy that disrupts the cells with violent impact action with consequent release of the RNA. The released RNA then is recovered, e.g., from a liquid phase of the starting material, such procedure being known in the art. One mechanical lysing protocol employs bead mill separation, the source material being confined in a vessel in a liquid phase thereof, there also being minute or small sized beads contained in the vessel. Rapid oscillation of the vessel is used to impart impact energy to the beads and these strike the source material cells repeatedly to open the cells so the RNA can release.

Certain known separation devices and particularly bead mill types are limited as to production capacity, i.e., the number of specimen vessels that can be oscillated at one time. For example BEAD BEATER bead mills manufactured by BioSpec Products of Bartlesville, Okla., for a long time only could be used to oscillate one specimen at a time, although recently a bead mill for use with up to eight specimen vessels at one time has been introduced. These bead mills either single or plural specimen holding, operate to reciprocate the specimen holding vessels horizontally with respect to a horizontal axis defined by a rapidly rotating shaft that drives the oscillating mechanism. Where plural specimen vessels are oscillated together, they have been clustered close about the horizontal axis. A disadvantage of that arrangement is that reproducibilty of oscillating conditions to be the same in each vessel is difficult, if at all possible, to achieve. Where a separation protocol is to be practiced, conditions occurring in each specimen should be replicated identically in each.

Oscillating a cluster of specimen vessels along a horizontal or near horizontal axis and involving use of bead mills of the above description presents serious balance problems in the oscillation producing mechanism creating destructive effects leading to short mechanism service life, the effect of horizontal oscillation on the mechanism bearing unit, for example, being most extreme.

Another shortcoming of known bead mills is lack of capacity to produce oscillations greater than about 2800 oscillations per minute (about 46 Hz). As a result, these bead mills are not capable of disrupting the cells of certain types of RNA source material, and hence resort must be had to chemical lysing.

In dealing with the quest for improving mechanical lysing of RNA, it is seen that apparatus that allows simultaneous separation of plural samples at very high oscillating rate while maintaining optimum balance in the apparatus heretofore was not available, this being attributable in part to understanding that to combine high oscillation rate with high average linear acceleration in the material is difficult.

It is desirable therefore, that apparatus and method be provided which more rapidly effects mechanical separation of RNA from a source thereof and does so without adverse effect on the RNA. In particular it is desirable that such apparatus operate at speeds as high as 133 Hz (8000 oscillations per minute) and be effective to impart average linear acceleration to a source material contained in the presence of small sized beads of up to about 400 g or more thereby to produce relatively complete RNA separation in a time period that can be as low as about 15 to 180 seconds where a specimen vessel of 2 ml volume is used to contain the specimen (50–200 microliters), about a half cc of small sized beads and about one ml of liquid.

OBJECTS AND SUMMARY OF THE INVENTION

Accordingly, it is an object of the invention to provide apparatus for rapidly oscillating specimen vessels which overcomes the drawbacks of the prior art.

It is a further object of the invention to provide apparatus for rapidly oscillating specimen vessels in a protocol for recovering RNA from sources thereof so that such recovered RNA can be used for diverse and varied biological purpose.

It is a still further object of the invention to provide apparatus which functions to disrupt specimen cell walls more rapidly and more completely than heretofore.

A further object is to provide apparatus for effecting cell disruption of materials which heretofore could only be disrupted by chemical disruption protocol because no effective apparatus with which same can be disrupted mechanically was available.

Another object is to provide apparatus for effecting mechanical disruption of materials which apparatus can operate to produce average linear acceleration values in materials not previously thought attainable thereby to encourage development of new protocols and use of materials not previously considered for mechanical lysing.

Still another object is to provide apparatus of the described type that has optimized balance characteristics during operation and is therefore less destructive of certain of the several component parts of which it is made.

Another object of the invention is to provide apparatus which allows for rapidly oscillating a large number of specimen containing vessels at the same time and in manner as allows all specimens to be subjected to the identically same force conditions.

Another object is to provide an improved method of separating RNA from a source material.

Still another object is to provide a specimen vessel especially useful in an RNA separation protocol.

Briefly stated, there is provided apparatus and method for rapidly oscillating specimen containing vessels such as those used in an RNA recovery operation wherein small sized glass beads in the container are employed to disrupt the cell walls of an RNA component to release the RNA, which includes a specimen vessel holder provided as a disc in which the vessels are received. The disc is operably connected with oscillatory motion producing means that in operation oscillates the disc rapidly in an oscillatory movement up and down symmetrically of a fixed vertical axis. The disc is haltered so it cannot rotate about the fixed axis. Locking means in the form of a locking plate locks the vessels on the vessel holder and applies clamping force thereto to prevent relative movement between the vessels and the holder so that generation of heat that could be detrimental to the specimen material or the vessels holding same is obviated.

In accordance with these and other objects of the invention, there is provided apparatus for rapidly reciprocally vibrating specimen containing vessels to accelerate specimen material in the vessels to relatively high g levels which includes a disc shaped vessel holder, the vessel holder having vessel receptive structure arrayed thereon at a plurality of circularly spaced locations proximal a disc edge periphery for receiving and holding up to a corresponding plurality of specimen vessels thereon. A vertically oriented rotary shaft rotatable about a fixed axis has a mounting collar fixed thereon to rotate therewith. The mounting collar has an outer surface, this outer surface being symmetrical about an axis skewed longitudinally of the fixed axis. The vessel holder is mounted on the collar outer surface such that the vessel holder vessel receptive structure is symmetrically arrayed with respect to the skewed axis and such that there is relative rotatability between the mounting surface and the vessel holder. When the mounting collar is rotated by rotary shaft rotation and the vessel holder not held, it tends to rotate in unison with the mounting collar about the skewed axis but if the vessel holder is held against this tendency to rotate with the mounting collar, the vessel holder will be caused to oscillate vertically up and down symmetrically of the fixed axis with any given point at the disc edge periphery undergoing one complete oscillation for each rotary shaft revolution. Means are provided for rapidly rotating the rotary shaft about said fixed axis, as is means for haltering the vessel holder so that it cannot rotate in unison with the mounting collar.

According to a further feature of the invention, there is further provided apparatus for rapidly reciprocally vibrating specimen containing vessels to accelerate specimen material in the vessels to relatively high g levels, which comprises a disc shaped vessel holder, along with a vertically oriented rotary shaft rotatable about a fixed axis with the vessel holder being mounted on the rotary shaft such that there can be relative rotatability therebetween. Means are provided for holding the vessel holder to constrain a rotation of the vessel holder if the rotary shaft is rotated. Oscillatory motion producing means is operably connected with the rotary shaft and the vessel holder and is operable such as to cause the vessel holder to oscillate vertically up and down symmetrically with respect to the fixed axis when the rotary shaft is rotated, any given point at an edge periphery of the disc undergoing one complete oscillation for each rotary shaft revolution. The disc shaped vessel holder has a circularly arrayed uniformly spaced plurality of specimen vessel receptive openings therein located proximal the edge periphery of the vessel holder, with a center of each opening being equidistant from the fixed axis whereby an oscillation produced acceleration to which a material contained in a specimen vessel received in an opening is subjected, is substantially the same with respect to that produced in a specimen vessel received in another opening.

In accordance with another feature of the invention, there is provided that in a method of lysing RNA from a source material thereof which includes rapidly reciprocally oscillating the source material in the presence of a liquid medium containing small size beads, there be practiced the step of subjecting the specimen material to oscillations at an oscillatory rate of between about 50 Hz to about 133 Hz and effective to produce an average linear acceleration in the source material which is in a range of about 150 g to about 415 g for a period of between about 10 to about 180 seconds.

In another aspect, the invention provides a vessel or container useful for containing a specimen material which is to be subjected to a specimen treatment during which treatment, the vessel and or specimen material can be exposed to heat that could be detrimental to specimen and/or vessel integrity, this vessel being a sealable member having an inner specimen compartment for holding a specimen material, and an outer casing surrounding the inner compartment in which a freezable or readily cooled fluid can be received so that when such fluid has been frozen or cooled to very low temperature and the contained specimen subjected to said treatment, the specimen in the inner compartment and the vessel structure is temperature protected from heat produced incident the treatment by preferential transfer of heat into the fluid. Means such as removable caps for sealing an entry to each of the inner compartment and the outer casing are provided.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is a fragmentary vertical sectional view of a peripheral portion of the vessel holder depicting another form of lock member for clamping the locking plate tightly against the holder so that clamping force is exerted by the fingers against vessel tops;

FIG. 6 is a fragmentary elevational view of a portion of the vessel holder and an anchor structure showing halter means wherein magnets are employed to halter the holder against rotation in unison with the mounting collar during operation of the apparatus;

FIG. 7 is a fragmentary elevational view taken on the line VII-Vii in FIG. 6;

FIG. 8 is a fragmentary plan view of a peripheral portion of the vessel holder illustrating a further embodiment of halter means wherein a post and keeper ring are used, one of such elements being mounted on the anchor structure and the other on the vessel holder;

FIG. 9 is a fragmentary elevational view of the structure depicted in FIG. 8; and FIG. 10 is a vertical central sectional view on enlarged scale of a specimen vessel specially suited for use with the apparatus of the invention and which embodies a casing encircling the specimen holding part of the vessel, the casing holding a heat absorbing medium for drawing heat from the specimen and vessel during oscillation of the apparatus.

DETAILED DESCRIPTION OF THE PREFERRED EMBODIMENTS

The invention deals with apparatus specially suited for RNA separation from its source material by subjecting that material to mechanical energy, this being done with employment of small sized glass or like material beads in a liquid. This separation practice is known.

The apparatus of the invention is useful for carrying out RNA separation protocols involving various RNA source materials inclusive of bacteria, plant tissue, animal tissue, muscle, leaves, skin, etc. While small sized, i.e., about 0.2 mm to about 1.5 mm glass beads most usually will be used in the protocol, other more dense material beads such as a zirconium silica oxide ceramic bead can be used these being more dense than glass and of advantage where higher oscillation average linear acceleration forces in the specimens are desirous.

RNA lysing by mechanical means involves accelerating the source material to relatively high g (acceleration imparted to a body by gravity acting in a vacuum being one g) levels in a reversible fashion in a short time to expose it to an average linear acceleration that will produce bead impacts with the source material that produces the cell disruption or fracture to allow release of RNA from the cells.

In accordance with the invention, average linear accelerations achievable with the apparatus can range between from 150 g up to at least about 415 g or more. Further, oscillation rates of up to at least about 116 Hz to 133 Hz or more are possible. 116 Hz corresponds to an oscillation rate of 7000 and 133 Hz to a rate of 8000 per minute.

In practicing a protocol it is convenient to use inexpensive, disposable plastic vessels or vials for holding the source material.

The apparatus is intended particularly for use in a laboratory environment wherein it will be sited on a counter or table top readily accessible for use by the scientist or technician. For that reason it will be housed in a casing having a cover, and since tile apparatus is portable and of reasonable weight and size is readily movable from one to another laboratory location without difficulty. The casing preferably will be fitted with suction cups at the underside as these obviate any movement action of the casing along a counter top during operation, and caused by operation vibrations. To further diminish vibration effect, the apparatus is isolated from the casing by vibration absorbing means.

Figure 1:
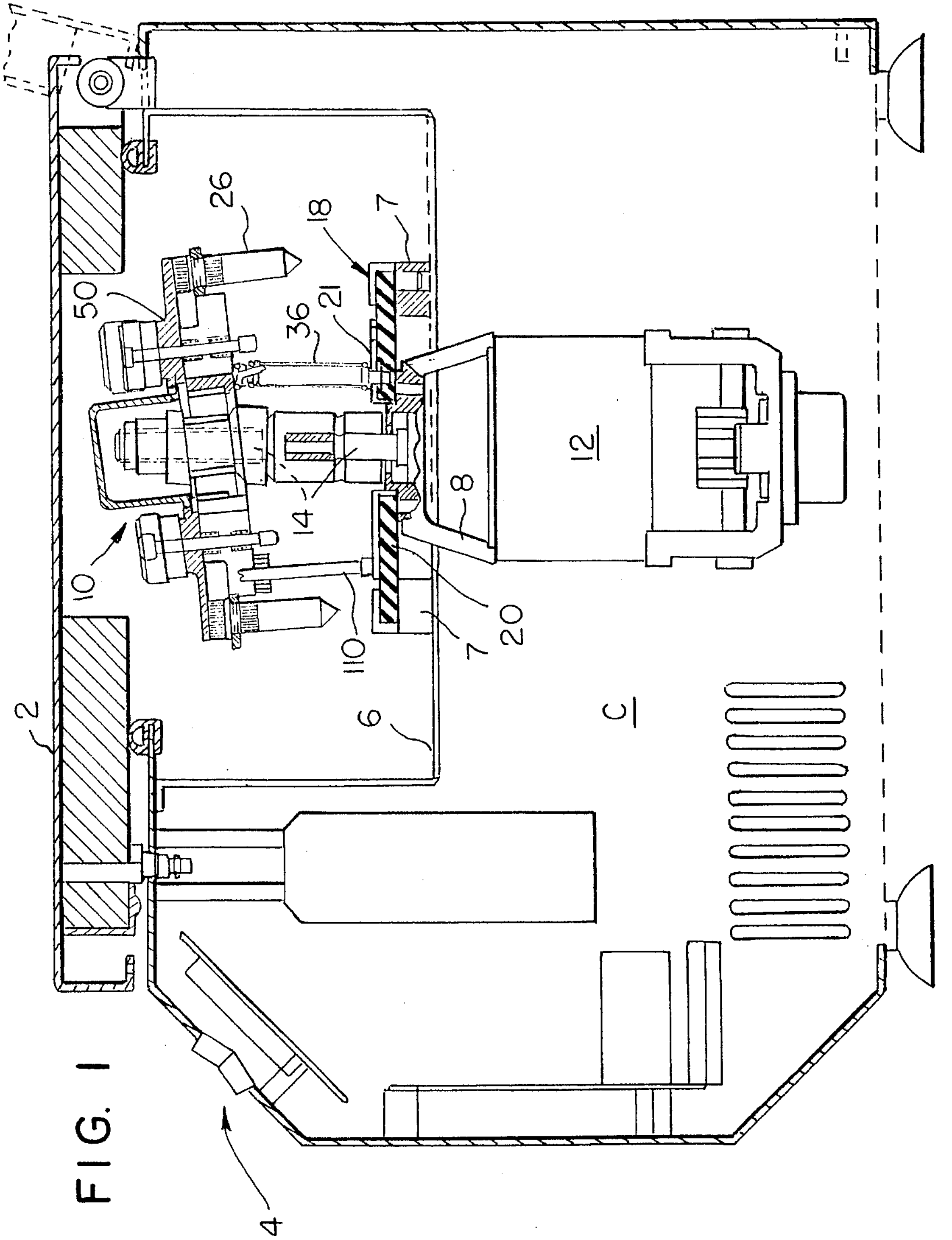
FIG. 1 is a vertical side elevational view of the apparatus of the invention as it is housed in a casing, a side wall of the casing being removed for convenience of depiction and some parts being shown in section, there being depicted several specimen containing vessels received on the holder disc and showing further a tilting of the vessel holder in a position denoting the vertical extremes of the vertical oscillating movement to which it is subjected during apparatus operation.

FIG. 1 depicts a casing C in which the apparatus 10 is housed. The casing C includes a cover 2 which is closed during the apparatus operation, and it can be provided with safety interlock features such that the cover is locked and cannot be opened during operation and that the drive motor operating the apparatus cannot be activated unless the door is closed. Such features are consider essential to protect personnel and prevent injury from apparatus that operates at extremely high speeds.

Within the casing, a fixed support drum 6 will mount the apparatus through the intermediate vibration absorbing anchor structure to be described later. In this manner no serious or undesirable vibration effect will transmit from the operating apparatus to the casing structure. The casing C also will mount controls such as switches, timer unit etc these being shown generally at 4. Further, the casing can include a fan unit therein to circulate a stream of cooling air against the apparatus to carry off heat therefrom which is generated during operation and particularly in the bearing unit that will be described later.

Figure 2:
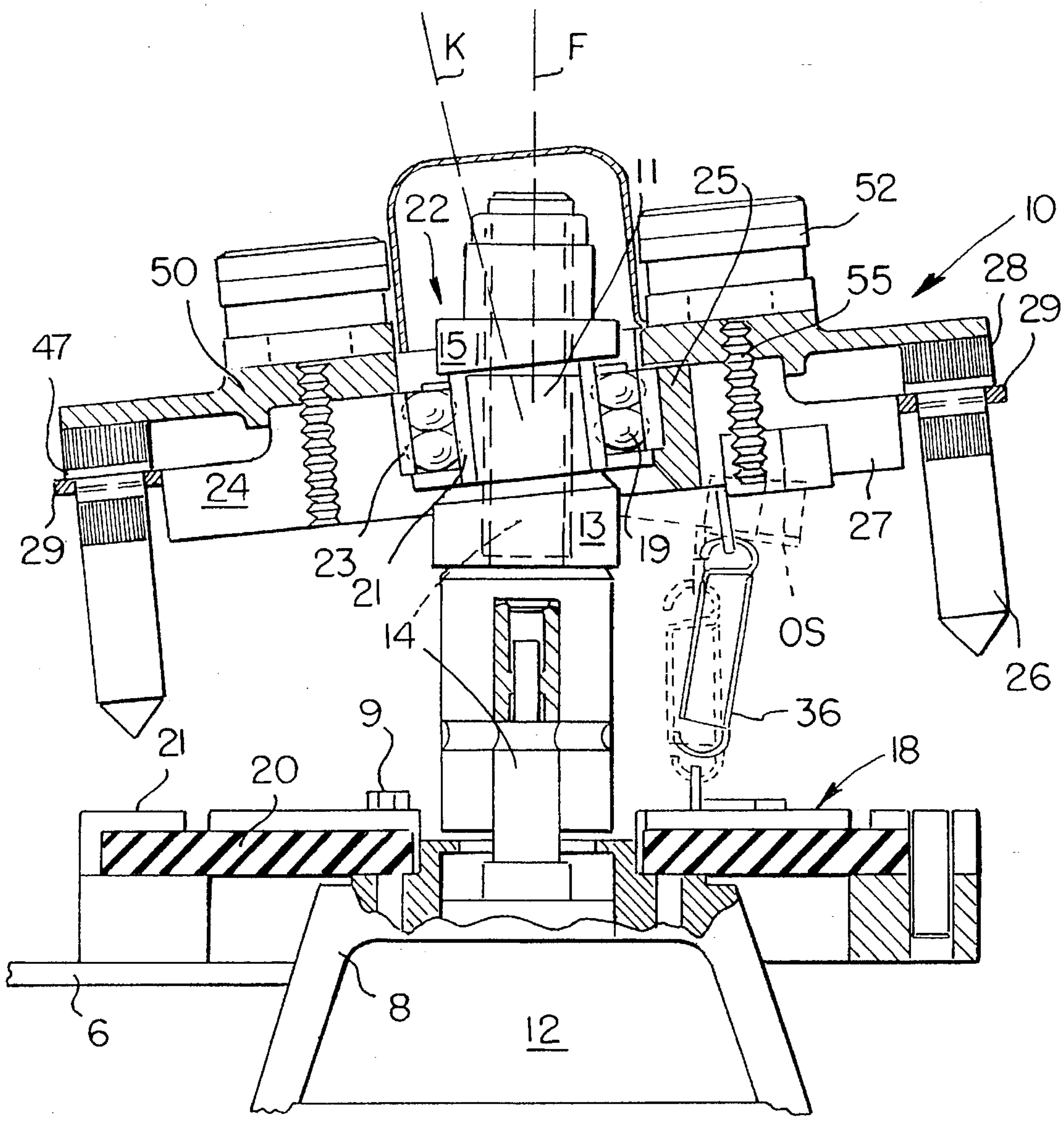
FIG. 2 is a fragmentary view of the FIG. 1 apparatus on enlarged scale.

With reference to FIG. 2, the apparatus 10 comprises a drive motor 12 having a vertically oriented output or drive shaft 14 which is rotatable about a fixed vertical axis, the motor being hung or suspended from anchor structure shown generally at 18, the motor being capable of rotating at speeds up to at least about 8000 R.P.M. The anchor structure 18 includes a plate 21 and blocks 7 on which it is set, the blocks in turn being mounted on drum 6. Intervening the plate 21 and the blocks 7 is a resilient material pad 20 which preferably is of rubber and one which exhibits stiffness in respect of a twisting thereof yet is readily flexible and yielding in respect of vertical force applied thereto. Pad 20 serves to damp vibrations transmitted through the plate 21 that otherwise could enter the drum 6 and transmit to the casing C.

The upper part of the housing 8 of the motor 12 is connected to the plate 21 as by bolts 9 (only one shown) and in such manner the motor and the remainder of the apparatus is suspended mounted thereby lessening vibration generation in the apparatus and casing.

The single suspended mounting of the apparatus is particularly effective to the purpose of minimizing operation produced vibrations, this being achieved with use of a single relatively thin disc shaped pad member 20 and placement of the orientation of the pad member to be planar perpendicular to the fixed axis F. The pad member as noted above is selected as a rubber component exhibiting two stiffnesses. With respect to torque force circularly acting in direction perpendicular to axis F, the pad is extremely stiff which is desirable from the standpoint of dealing with torque as a factor in vibration cause. On the other hand and with regard to force acting parallel to the axis F, the pad material is very soft, i.e., has little stiffness so that the force is readily damped by the flexibility of the pad in that force direction.

The apparatus includes oscillatory motion producing means shown generally at 22, the oscillatory motion producing means being of a type similar to that used to produce a like motion in the earlier-mentioned BioSpec bead mills. Such means includes an eccentric mounting collar 11 integral with a hub 13, this unit being screwed on to shaft 14 and rotatable with shaft 14.

This oscillatory motion producing means also includes a bearing unit comprised of an inner race 21 clamped between hub 13 and a nut 15 threaded on shaft 14 so as to be fixed to rotate with the mounting collar, an outer race 23 fixed to a central bore of a relatively widened, relatively shallow vessel holder 24 made preferably in the shape of a disc located a distance above the anchor structure, and a plurality of ball bearings 19 captive between the races. A preferred form of bearing is a double row angular contour ball bearing.

The mounting collar 11 has an outer surface which is symmetrical about an axis K which is skewed longitudinally of the fixed shaft axis F. Thus it is seen that the vessel holder 24 is mounted on the mounting collar such that vessel holder vessel receptive structure (to be described shortly) is symmetrically arrayed with respect to this skewed axis K. Further it is seen that relative roarability exists between the vessel holder and the mounting collar.

With this arrangement, it is seen that if the vessel holder 24 not be held during rotation of the mounting collar 11, the vessel holder would be caused to have a certain rotation in unison with the mounting collar about axis K, such rotation being at the inclined solid line showing of the vessel holder in FIG. 2. On the other hand, if the vessel holder 24 is haltered or held during mounting collar 11 rotation, the vessel holder will be caused to oscillate vertically up and down and symmetrically with respect of fixed axis F. This movement is illustrated in exemplary showing in dashed line vessel holder fragment positioning as at OS in FIG. 2.

It will be understood that this vertical oscillatory movement of the vessel holder occurs such that any given point at the periphery of the vessel holder will undergo one complete oscillation up and down each time shaft 14 and mounting collar 11 make one complete revolution.

Vessel holder 24 in a preferred form is a disc having a hub 25, a number of arms 27 emanating from the hub and terminating in an annular periphery ring 29. Annular periphery ring 29 it will be noted is of much lesser thickness than the thickness of radially inwardly parts of the vessel holder, this being desirable to reduce the mass of the holder.

Since considerable heat will be generated in the apparatus and particularly in the bearing unit during operation, it is desirable that the disc mass function as a heat sink to carry off heat, the disc for that reason being of a material which has good heat conductivity characteristic, aluminum being exemplary of such material.

The vessel holder 24 will have suitable structure thereon for reception and holding of a plurality (e.g., at least 18) of specimen containing vessels, the depicted ones of such being sealable vials 26, the vials being fitted with seal caps 28.

In simplest form, this holding structure can be constituted of a circle of uniformly spaced openings 32 carried in annular periphery ring 29 and passing therethrough from one to an opposite face. In this manner a vial body passes down through an opening 32 until its vial flange 47 engages the upper disc face adjacent the opening to hold the vial mounted on the disc. Other forms of holding structure or devices could be used instead of openings.

In connection with openings 32, a center of each is equidistant located from a center of the holder. In this manner, a specimen contained in a vessel received in an opening will be subjected to the exact same average linear acceleration values to which a specimen contained in a vessel received in any other opening 32 is subjected during apparatus operation. It is to be noted that average linear acceleration imparted to the specimen will be the same if only one vial is mounted on the vessel holder as that attendant mounting of a full complement of 18 vials on the vessel holder.

This sameness of replication of achieved linear acceleration for each separation protocol of each specimen whether for one or for 18 specimens at the same time, and stemming from symmetrical positioning of vessels on the vessel holder is seen as a major improvement over prior separating apparatus.

A halter means is used to prevent rotation of the disc 24 in unison with the mounting collar 11 during apparatus operation. This halter means can be, e.g., a tension type coil spring 36 connected to the disc at an underface part thereof and with the anchor structure 18, connection to the anchor structure minimizing extraneous vibration transmission to the spring. The spring 36 will be connected to the underface of the disc 24 at a radial location thereon which is closely proximal the shaft 14 and such that the spring disposes parallel to fixed axis F, this being done to limit the degree of tensing produced in the spring thereby reducing fatigue effect and lengthening spring useful service life.

By haltering the disc 24, oscillatory motion producing means drive effect thereon is as mentioned above to rapidly vertically oscillate the disc, periphery of the disc ring describing an imaginary rolling wave course about the shaft 14, it being understood that there is no circular travel of the shaft during oscillation thereof.

The result is that the vials 26 are rapidly oscillated in vertical reciprocal movements at a rate of as much as eight thousand oscillations per minute (133 Hz). Due to that rapid oscillatory movent of the vial, average linear acceleration values of up to 415 g are produced in the vial contents and the small sized beads in the vial produce very high impact magnitudes as they collide with the cells of RNA source material therein and produce significant cell disruption to allow RNA to release from the cells.

Depending on the type of RNA source material involved, essentially full RNA release can be effected very quickly and in a time period ranging from about 10 to about 180 seconds and particularly in a range of 20 to 45 seconds.

Because of the nature of the oscillatory movement to which the vials 26 are subjected, it is necessary to securely lock the vials on the disc periphery ring 29 so that during oscillation, no relative movement occurs therebetween as such relative movement could create high friction and consequent heat problems in the specimen and in the vessel.

Figure 3:
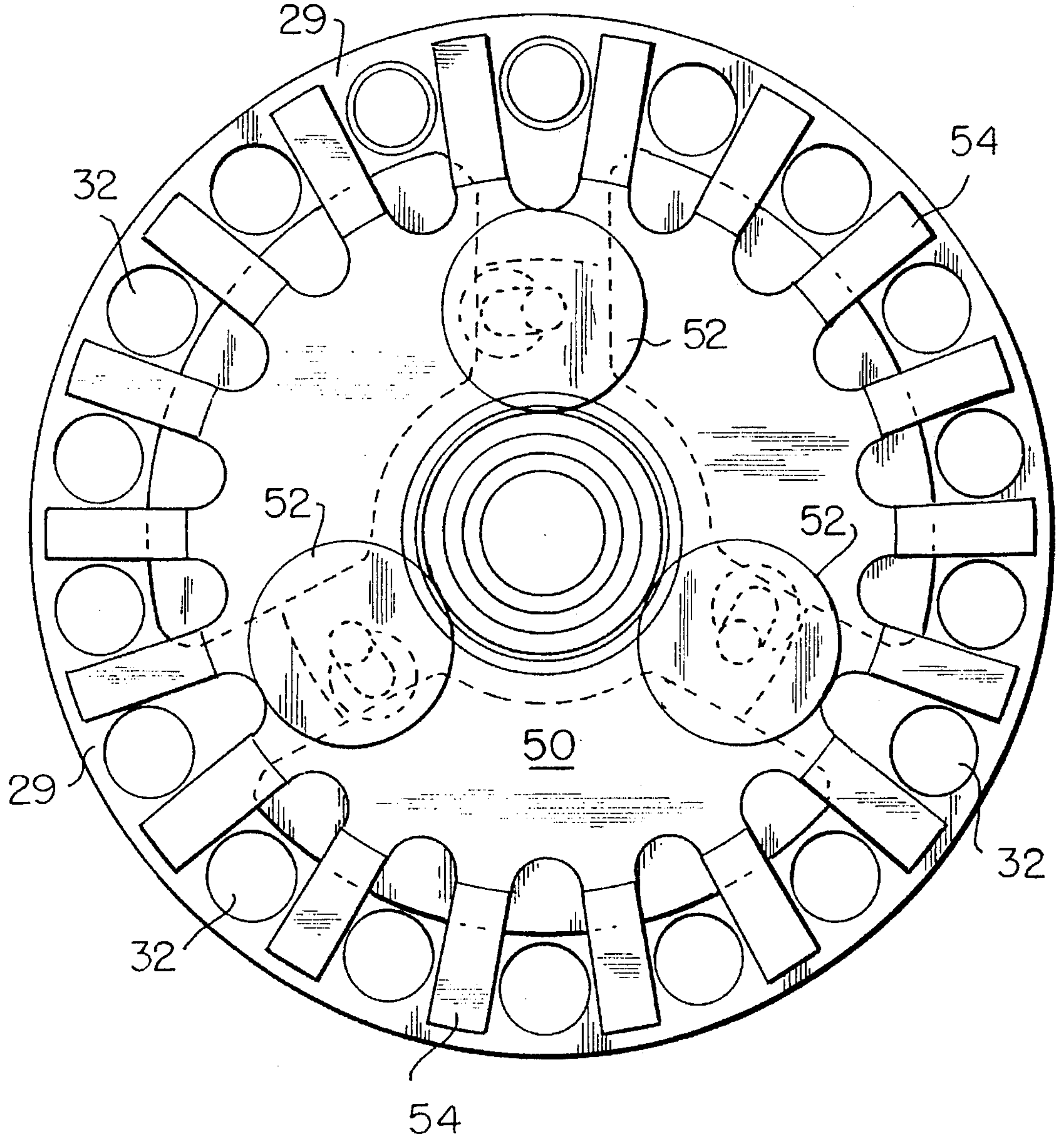
FIG. 3 is a top plan view of FIG. 2 and illustrates a fingered locking plate employed with the apparatus and having a lock member to lock the specimen vessels securely on the vessel holder to prevent relative movement between the vessels and the holder during oscillatory movement of the holder, the locking plate being in a clearing position as required for access to the holder receptor structure when mounting and demounting vessels.
Figure 4:
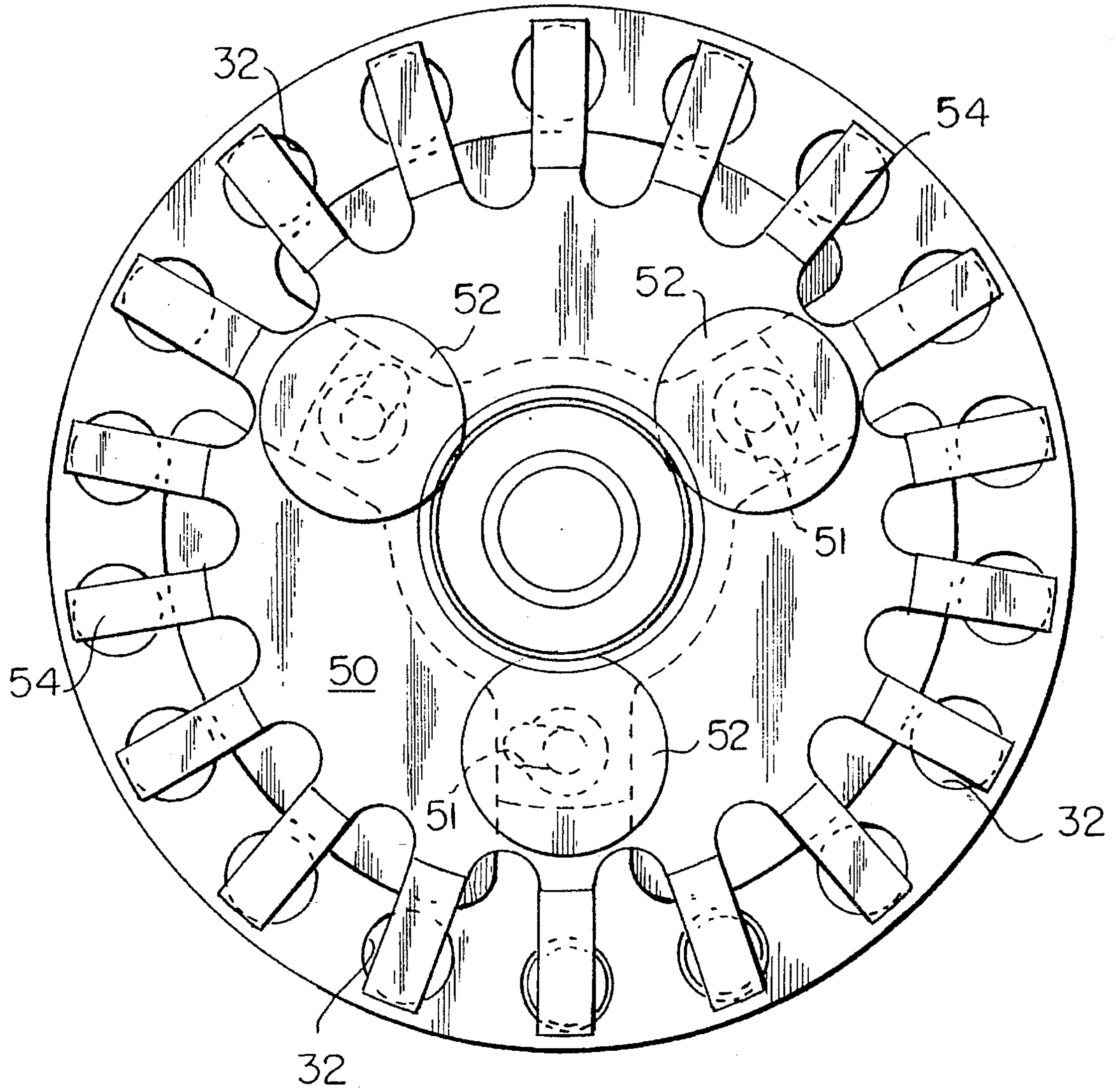
FIG. 4 is a view the same as FIG. 3 except the locking plate is shown in a circularly moved position wherein the fingers thereof superpose over the tops of the vessels and apply force to same to hold the vessels against movement relative to the holder during oscillatory movement thereof.

To obviate such possibility, the locking of the vials is done with a locking plate 50 as shown in FIGS. 3 and 4. The locking plate 50 is mountable on top of the disc 24 and can be secured to the latter with a number of locking members or hand manipulated knobs 52 threaded as at 55 into passages in the disc, tightening of the knobs to friction holding degree locking the fixing plate against the disc.

As shown in respective clearing and covering dispositions in FIGS. 3 and 4, the locking plate 50 has blind slots 51 therein so it is circularly movable on the disc to accommodate loading/unloading of vials on the disc on the one hand, and securely clamping the vials in place on the disc on the other hand.

To securely hold the vials, the locking plate 50 has a circle of spaced radial fingers 54 in correspondence to the number of vial receptive openings in tile disc. These fingers 54 when locking plate 50 is in locking position, engage the top of the vial caps 28 and apply hold down force to the vials. The urging is to forcefully hold tile vial flange 47 against the upper face of the disc periphery ring 29 adjacent the openings 32 in the disc. This bars relative movement between the vials and the disc during operation.

FIG. 5 shows another form of locking member 56 for clamping or locking the locking plate tightly against the vials and disc. It comprises a spring locking member unit which is depicted in unlocked position in dashed lines. By rotating the locking member arm 58 to the solid line position, a camming hold down effect is instituted.

Other forms of haltering means can be used with the apparatus, these being advantageous it spring fatigue is a problem with the earlier described haltering means. FIGS. 6 and 7 depict a haltering means 70 provided with permanent magnets. In such means 70, a bracket 72 carried on the anchor frame mounts a permanent magnet 74, and a bracket 76 carried on the underside of the disc 24 mounts a permanent magnet 78. These permanent magnets are arranged in a confronting disposition, and the poles thereof arranged so that like poles face each other. This creates a magnetic repelling force that acts against the disc 24 so that if it tends to rotate in unison to any degree with the mounting collar during apparatus operation, the :magnet repelling force prevents such disc rotation. It is to be understood that at least one of the magnet members will be of greater vertical dimension than the other to take into account the relative vertical movement of the magnet mounting elements that occurs during oscillation.

FIGS. 8 and 9 show a still further form of haltering means comprised of an upstanding post 80 carried on the anchor structure, and a passage 82 formed through the disc 24. The post 80 extends through the disc passage so that rotative movement of the disc is effectively barred.

Where the haltering means is susceptible to failure, an occurrence more likely where a resilient spring is used, it is important to provide a backup haltering means such as that 110 depicted in FIG. 1, such backup means being, e.g., the same as that depicted as a haltering means in FIG. 9.

FIG. 10 shows a vial 90 that includes an inner compartment 92 for holding specimen material, small sized beads etc. A casing wall 94 surrounds the outside of the inner compartment defining structure leaving a space 96 that can be filled with a heat transfer liquid such as water. Caps 108, 109 are used to seal entry to the inner compartment 92 and space 96. Prior to use, the vial can be placed in a freezer so as to chill the liquid which if water freezes to ice. When used, heat generated during oscillation of the vial can be absorbed by the fluid or ice which acts as a heat sink drawing heat away from the vial structure and the contents.

In effecting RNA separation, it generally is best effected by rapidly reciprocally oscillating the RNA source material in the presence of bead containing liquid medium at such a rate that produces an average linear acceleration in the source material which is in a range of about 150 g to about 415 g and at an oscillation rate between about 50 Hz to about 133 Hz, the period involved for effecting separation being one in a range of time between about 10 to 180 seconds. Many protocols can be practiced with effective result using an oscillatory rate of about 108 Hz such as to produce average linear acceleration of at least about 275 g for a period of between 20 to 30 seconds.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for rapidly reciprocally vibrating specimen containing vessels to accelerate specimen material in the vessels to relatively high g levels, said apparatus comprising a disc shaped vessel holder, the vessel holder having vessel receptive structure arrayed thereon at a plurality of circularly spaced locations proximal a disc edge periphery for receiving and holding up to a corresponding plurality of specimen vessels thereon, a vertically oriented rotary shaft rotatable about a fixed axis, a mounting collar fixed on the rotary shaft to rotate therewith, the mounting collar having an outer surface, the said outer surface being symmetrical about an axis skewed longitudinally of the fixed axis, said vessel holder being mounted on said collar outer surface such that the vessel holder vessel receptive structure is symmetrically arrayed with respect to said skewed axis and such that there is relative rotatability between said mounting surface and said vessel holder, the vessel holder when the mounting collar is rotated by rotary shaft rotation and the vessel holder not held, tending to rotate in unison with said mounting collar about the skewed axis but if said vessel holder be held against tendency to rotate with said mounting collar, the vessel holder being caused to oscillate vertically up and down symmetrically of the fixed axis with any given point at the disc edge periphery undergoing one complete oscillation for each rotary shaft revolution, means for rotating said rotary shaft about said fixed axis, and means for haltering the vessel holder so that it cannot rotate in unison with the mounting collar.

2. The apparatus of claim 1 in which the vessel holder receptive structure circularly spaced locations on the vessel holder are uniformly spaced one from another.

3. The apparatus of claim 2 in which the vessel holder receptor structure comprises openings in the disc passing from one disc face to an opposite face of the disc.

4. The apparatus of claim 3 in which the openings in the disc are located in a disc edge periphery portion which is of a relatively thinner thickness than a thickness of a remainder of the disc.

5. The apparatus of claim 1 in which the vessel holder receptive structure at the said plural locations is for each such structure equidistant located from a center of the vessel holder.

6. The apparatus of claim 1 in which the means for haltering the vessel holder is connected with the vessel holder and with a vibration absorbing anchor structure located a distance below the vessel holder.

7. The apparatus of claim 6 in which the haltering means comprises a post upstanding from the anchor structure and extending through a passage in the vessel holder.

8. The apparatus of claim 6 in which the haltering means comprises companion magnet members respectively fixed to and extending upwardly from the anchor structure and downwardly from the vessel holder, the magnet members disposing in laterally spaced facing confrontation with like magnet poles in proximal positioning so as to induce repelling force between said magnet members sufficient to counter any tendency of the vessel holder to rotate in unison with the mounting collar.

9. The apparatus of claim 1 in which the means for haltering the vessel holder comprises a resilient member, the resilient member extending substantially parallel to said fixed axis.

10. The apparatus of claim 9 in which the resilient member is connected with the vessel holder at a location thereon which is closely proximal said fixed axis.

11. The apparatus of claim 10 in which the resilient member is a coil spring.

12. The apparatus of claim 11 in which the coil spring is a tension type.

13. The apparatus of claim 1 in which the means for rapidly rotating the rotary shaft is operable to rotate said rotary shaft at speeds up to about 8000 R.P.M.

14. The apparatus of claim 1 further comprising locking means for locking specimen vessels received on the vessel holder in a fixed positioning thereon to prevent relative movement between the specimen vessels and the vessel holder receptor structure during oscillatory movement of the vessel holder.

15. The apparatus of claim 14 in which the locking means comprises a locking plate mountable on the vessel holder and having plate portions superposable over the specimen vessels, the locking means including lock 4 members connectable with the vessel holders and operable to engage the locking plate for applying urging force thereto and therewith urge the said plate portions tightly against the specimen vessels to hold same tightly against movement relative to the vessel receptive structure wherein received.

16. The apparatus of claim 15 in which the lock members include a lock member urging part locatable on top of the locking plate and a lock element extending downwardly from the said lock member urging part through the locking plate to a connected joinder to the vessel holder.

17. The apparatus of claim 16 in which the lock member lock elements are screw thread devices.

18. The apparatus of claim 16 in which the lock members are cam actuated components.

19. The apparatus of claim 1 in which the vessel holder is mounted on the mounting collar with a bearing assembly, said bearing assembly including an inner race fixed to rotate with the mounting collar, an outer race fixed to the vessel holder in a central bore thereof, and a plurality of bearing elements captively held between the inner and outer races.

20. The apparatus of claim 1 in which the means for rapidly rotating the rotary shaft is a drive motor, the drive motor being supported from a mounting which includes a support and a vibration absorbing anchor structure located on the support, the drive motor being connected to the anchor structure, the anchor structure including a plate spaced above the support and a pad of resilient material filling the space between the anchor structure plate and the support.

21. The apparatus of claim 20 in which the resilient material pad is of a rubber which is relatively stiff is respect of force applied thereto in a direction perpendicular to the fixed axis but which is relatively flexible in respect of a force applied thereto in a direction parallel to said fixed axis.

22. The apparatus of claim 1 comprising backup haltering means for haltering the vessel holder to prevent it from rotating in unison with the mounting collar in the event of a failure of the first-mentioned haltering means.

23. Apparatus for rapidly reciprocally vibrating specimen containing vessels to accelerate specimen material in the vessels to relatively high g levels, said apparatus comprising a vessel holder, a vertically oriented rotary shaft rotatable about a fixed axis, the vessel holder being mounted on the rotary shaft such that there can be relative rotatability therebetween, means for holding the vessel holder to constrain a rotation of the vessel holder if the rotary shaft is rotated, and oscillatory motion producing means for oscillating the vessel holder, said oscillatory motion producing means being operably connected with said rotary shaft and said vessel holder and operable such as to cause the vessel holder to oscillate vertically up and down symmetrically with respect to the fixed axis when the rotary shaft is rotated, any given point at a vessel holder periphery undergoing one complete oscillation for each rotary shaft revolution, the vessel holder having a symmetrical array of a plurality of specimen vessel receptive openings therein, a center of each said opening being equidistant from a center of the holder whereby an oscillation produced acceleration to which a material contained in a specimen vessel received in an opening is subjected is substantially the same with respect to that produced in a material in a specimen vessel received in any other opening.

* * * * *